United States Patent [19]

MacFarlane

[11] 4,205,827
[45] Jun. 3, 1980

[54] RIGGING OF TELEPHONE WIRES
[75] Inventor: John H. T. MacFarlane, Middlesex, England
[73] Assignee: The Post Office, London, England
[21] Appl. No.: 947,953
[22] Filed: Oct. 2, 1978
[30] Foreign Application Priority Data
Oct. 4, 1977 [GB] United Kingdom ............... 41242/77
[51] Int. Cl.$^2$ .............................................. B66D 1/36
[52] U.S. Cl. ........................................... 254/134.3 FT
[58] Field of Search ............... 254/134.3 R, 134.3 FT, 254/190; 15/104.3 R, 104.35 N, 104.3 G

[56] References Cited
U.S. PATENT DOCUMENTS
4,077,609   3/1978   MacFarlane ............... 254/134.3 FT Primary Examiner—Robert C. Watson
Attorney, Agent, or Firm—Kemon & Estabrook

[57] ABSTRACT

This invention relates to the rigging of wires, particularly telephone wires, between two elevated locations specifically two telegraph poles or a telegraph pole and a location on the upper part of a building. The telephone wire to be rigged is fed around the pulley of a pulley block. The block is attached to the end of the sash line which emerges from the pole top and the block carrying the loop of wire hoisted to an elevated position. The free end of the wire is then fixed to the other elevated location for example the side of a house and the wire drawn tight to its working position. By manipulation of the other end of the sash line and the wire the pulley block carrying the loop of the wire is guided into the top of the pole, down through the interior of the pole and out through the access aperture in the lower part of the pole. The wire is then secured in the pole, the loop is severed and the appropriate electrical terminations made.

1 Claim, 7 Drawing Figures

RIGGING OF TELEPHONE WIRES

This invention relates to the rigging of wires, particularly telephone wires, between two elevated locations specifically two telegraph poles or a telegraph pole and a location on the upper part of a building. The invention has specific application to hollow poles. Solid poles are generally in use at the present and the hollow poles described hereinafter offer major advantages. They are light in weight and can be rigged from the ground using an access opening adjacent the base of the pole.

U.S. Pat. No. 4,077,609 describes and claims a threading device, apparatus and method which enables a sash line to be threaded through an access opening in the lower part of a hollow telegraph pole, out of the top of the pole and back to the ground. The disclosure of this Specification is incorporated by reference. The sash line provides a loop by means of which a plurality of telephone wires are drawn successively into the pole. The method of this Patent Specification involves towing or drawing each wire to its working elevated location over a bearing surface at the top of the pole. Although the problems inherent in this can be mitigated by using a suitable capping member, the installer has to remain very close to the pole base which causes problems in some installation situations.

In accordance with the present invention one end of a telephone wire to be rigged is fed around the pulley of a pulley block. The block is attached to the end of the sash line which emerges from the pole top and the block carrying the loop of wire hoisted to an elevated position. The free end of the wire is then fixed to the other elevated location for example the side of a house and the wire drawn tight to its working position. By manipulation of the other end of the sash line and the wire pulley block carrying the loop of the wire is guided into the top of the pole, down through the interior of the pole and out through the access aperture in the lower part of the pole. The wire is then secured in the pole, the loop is severed and the appropriate electrical terminations made.

The manipulation of the block into the pole can be carried out from a position quite remote from the pole and the pulley block is drawn down the inside of the pole by the sashline.

The invention will now be described by way of example and with reference to the accompanying drawings wherein.

Figure 1:
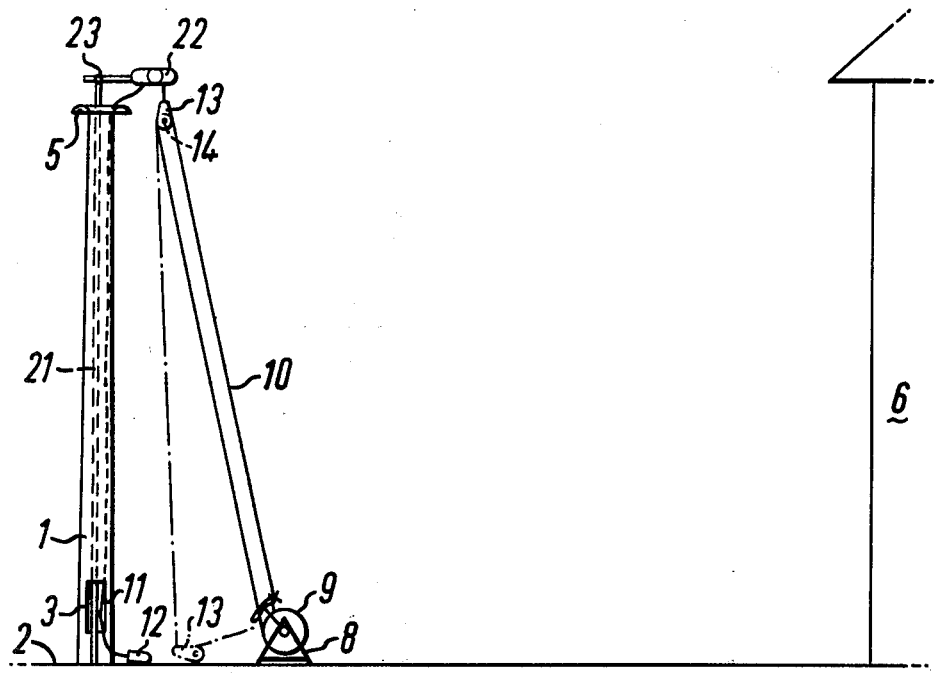
FIGS. 1, 2 and 3 are diagrammatic side views illustrating the method of the invention.
Figure 2:
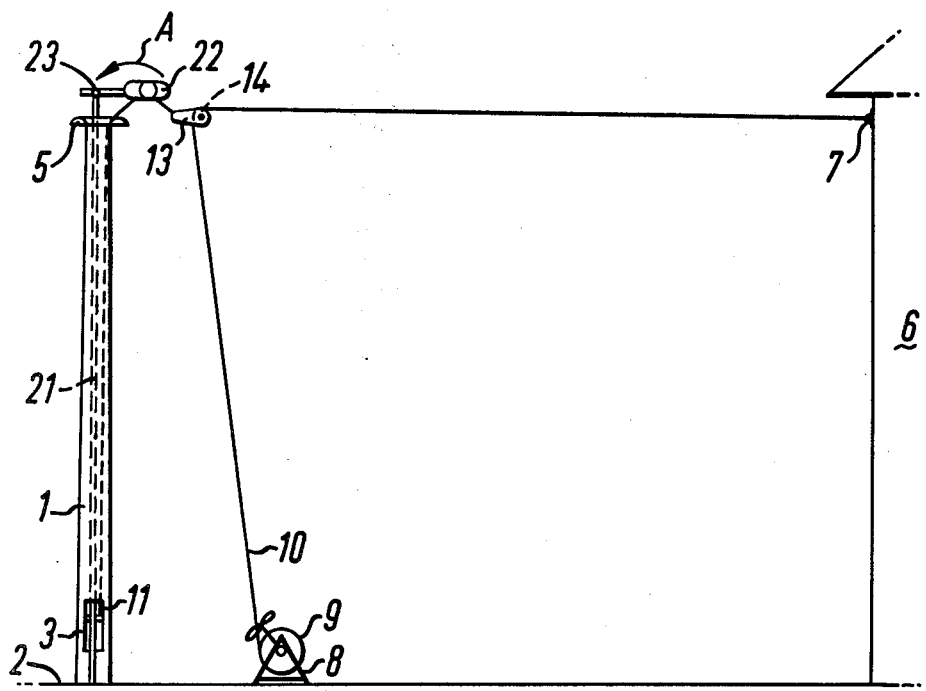
Figure 3:
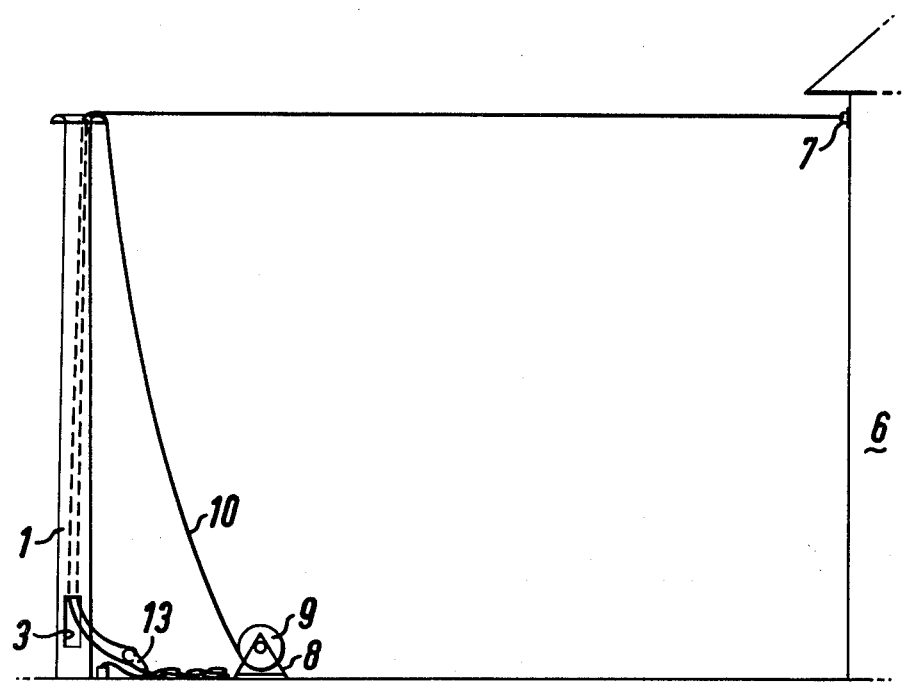
Figure 7:
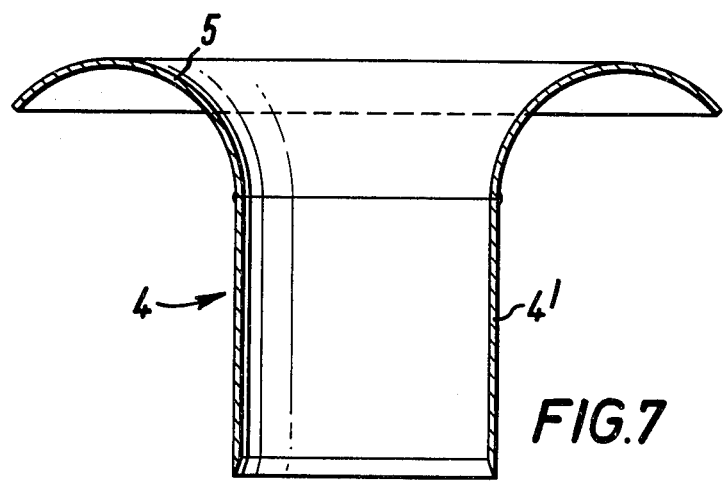
FIG. 7 is a sectional view of a capping member.

Referring initially to FIGS. 1, 2 and 3 of the drawings there is illustrated a hollow telegraph pole 1 projecting upwardly from a notional ground level 2. The pole 1 has a rectangular access aperture 3 at the lower part thereof normally closed by a door (not shown). A flared throat 5 defining rounded entry surfaces is provided at the upper end of the pole. This throat is provided by a separately formed plastic capping member illustrated in FIG. 7. The capping member comprises a cylindrical stem part 4' to fit the bore of the pole and the flared part defining 5.

The objective of the method is to install a telephone drop wire between the upper end part of the pole 1 and an elevated location 7 on building 6.

The installer brings to the site a wire storage and dispensing device 8 comprising a reel and mount for rotation about a horizontal axis, the reel 9 carrying wire 10. The dispensing device is provided with a brake opposing rotation in the dispensing sense to avoid overrunning and tangling. A sash line 11 having a weight 12 at one end is threaded using the techniques of U.S. Pat. No. 4,077,609 through the opening 3 up the interior of the pole 1 out through the top of the pole and back to the ground level 2. These techniques can rapidly be appreciated by considering FIGS. 4 to 6 of U.S. Pat. No. 4,077,609 and the associated description. The threading device comprises linked rods 21 and a threading head 22 hingedly connected at 23 to the rods. The head 22 can be folded into line with the rods when travelling through the pole. The rigging head and rods are left in situ inside the pole. The weight 12 is removed from the sashline and a pulley block 13, pear-shaped when viewed from the side and having the narrow end frontly directed has the front end part attached to the sash line as indicated in chain dotted lines in FIG. 1.

Figure 5:
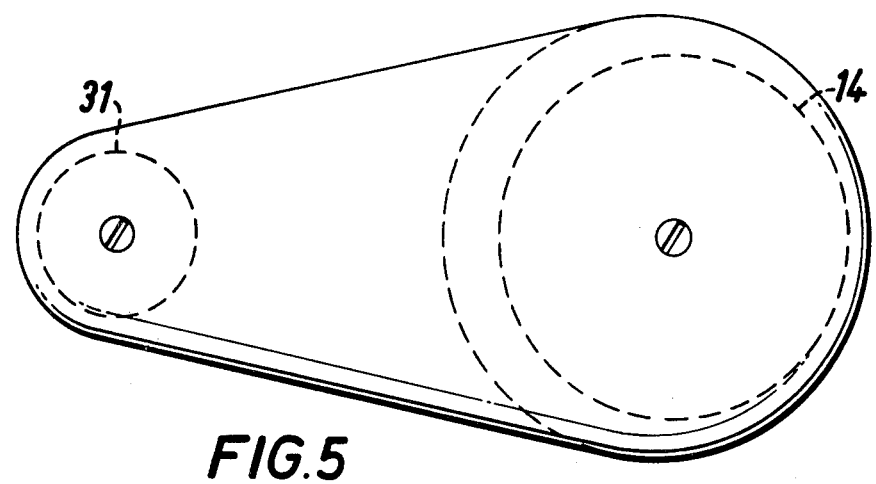
FIGS. 5 and 6 are side and edge views of the pulley block.
Figure 6:
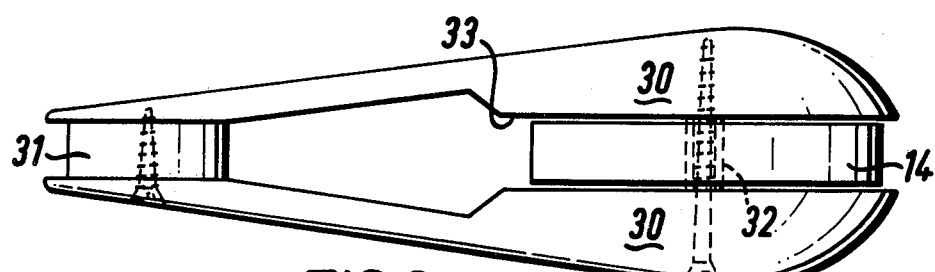

The pulley block is illustrated in detail in FIGS. 5 and 6 and comprises side pieces 30 joined at the front end by a cross piece 31 providing a fixing for the sash line 11 and at the rear by a stub axle 32 supporting the pulley 14. The side pieces 30 are formed to define a narrow channel 33.

The end of the wire 10 is wound from the reel 9 and fed round the pulley 14 of the block 13 and tied off to the handle of dispensing device 8, the block carrying the loop of wire hoisted by pulling the sash line emerging from opening 3 downwards and pulling the wire upwards from the dispensing device 8 to a position generally as indicated in FIG. 1. The sashline is tied off to the pole securing ring 15 FIG. 4 to hold pulley block in the elevated position. The free end part of wire 10 is then fixed to location 7 on the building to achieve the position which is illustrated in FIG. 2. The hoisting of the pulley block and the subsequent raising and tightening of wire to this position can readily be achieved by an installer quite remote from the pole. By maintaining tension on the sashline 11 and recovering the rods 21, the pulley block 13 is lifted over the flared throat of the capping member (FIG. 7) in the direction of arrow 'A' in FIG. 2 into the open throat at the top of the telegraph pole 1.

The boat-like configuration of the block 13 with the narrow bows and rounded stern ensures a smooth entry into the pole whilst the shaping of the pulley block inner walls specifically the definition of channel 33 ensures that the pulley block remains in the edge-on vertical orientation illustrated with the axis of the pulley horizontal. From the position shown in FIG. 2 the block carrying the loop of wire moves downwardly through the hollow telegraph pole for approximately 300 mm, when tension on the sashline 11 can be released and the rods and rigging-head can be recovered because the configuration of the wire over the capping member 5 and through the pulley block, locks the pulley block in this position. The wire loop is drawn out of access opening 3 to achieve the position illustrated in FIG. 3 by pulling down sashline 11 and feeding up wire from cable reel 9.

Figure 4:
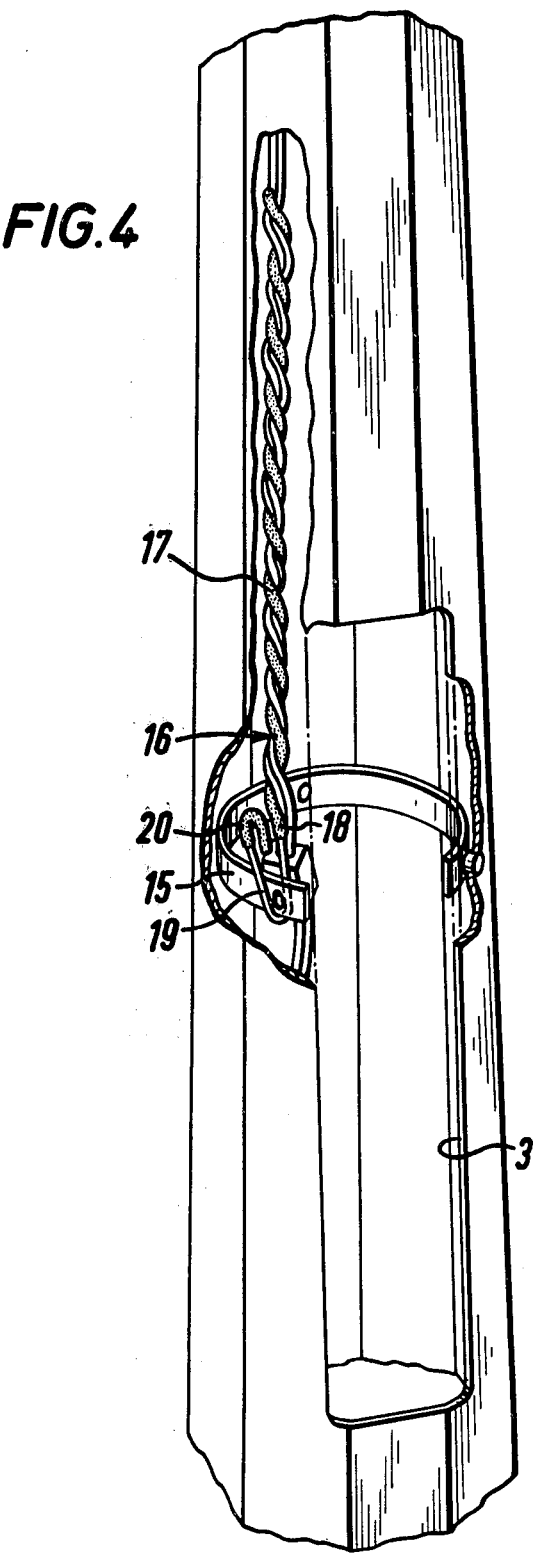
FIG. 4 is an enlarged scrap perspective view showing the aperture of a hollow telegraph pole with the telephone wire secured.

Reference is now made to FIG. 4 of the accompanying drawing. A securing ring 15 is fixed to the inner part of the pole and a gripping device 16 for the drop wire is shown in its anchored position. The gripping device 16 which may be used outside the context of the present invention comprises a relatively rigid but deformable wire-gripping section 17 of steel rod having a non-slip plastic outer sheath 18 and a lower anchoring part 19 bent upwardly into a U-shape and sidewardly out of the plane of the gripping section 17. The gripping device 16 is located in the vicinity of the axis aperature 3 and the gripping section 17 extends a short distance upwardly therefrom as shown in FIG. 3. The upper end section of the anchoring part 19 has a further locating hook part 20, plastic sheathed. The gripping section 17 is formed into the widely spaced coils of a narrow helix, i.e. a helix whose internal diameter is substantially zero.

Following on now from the description made with reference to FIG. 3 of the drawings we have the situation that the pulley block 13 with a loop of drop wire 10 has been threaded through the pole and rests on the ground. By finding which wire of the loop resists pulling the installer finds the wire which is fixed to the house at location 7. He winds this wire around the drop-wire gripping section 17 of device 16 as illustrated in FIG. 4. The drop wire is then secured in the pole. He then severs the loop leaving sufficient wire to make the termination (not shown) in the terminal block at the lower part of the pole. The wire beyond the cut is then wound back on to the reel. The hook part 20 engages the ring 15 to stop device 16 from being dislodged downwardly when the installer is working within the confined interior of the pole.

The securing ring 15, the device 16 and the hollow pole and associated parts form the subject of a Patent Application of even date by me. This application has a Ser. No. 947,954 filed Oct. 2, 1978 and the contents of the Specification of this copending Application are incorporated by reference.

I claim:

1. A method of rigging a telephone wire between two elevated locations at least one of which is a telegraph pole, such method comprising the following steps:
   (I) feeding one end of the wire to be rigged over the pulley of a pulley block;
   (II) attaching the block to a line threaded through the pole and emerging from the top of the pole;
   (III) hoisting the block to an elevated position;
   (IV) fixing the free end of the wire to the other elevated location;
   (V) manipulating the said line and the wire to guide the pulley block carrying the wire into the pole interior; and
   (VI) recovering the wire and pulley block from an access opening adjacent the pole base.

* * * * *